Patented Oct. 23, 1934

1,977,929

UNITED STATES PATENT OFFICE 1,977,929

PROCESS OF MAKING BUTTER

Herman D. Wendt, West Chester, Pa., assignor to Milk Processes, Inc., Philadelphia, Pa., a corporation of Pennsylvania No Drawing. Application February 23, 1934, Serial No. 712,654

12 Claims. (Cl. 99—11)

The present invention pertains to the art of butter making and it has had as a primary object the development of a process of producing butter which will result in a more adequate control of the quality and constitution of the finished butter than is possible in connection with processes of butter making in current use.

A further object of the invention has been to provide a process of butter making which will result in economies of labor, space and equipment.

A third object of the invention has been to provide a process of butter making by which butter of good quality may be produced from cream of such poor quality that high grade butter could not be produced therefrom by ordinary methods in present commercial use. Further objects and advantages will be obvious from a reading of the sub-joined specification.

In the preferred practice of the invention, cream or milk of normal butter fat content is heated to a temperature above the temperature at which its butter fat content becomes liquid and the heated milk product is passed through a centrifugal separator operating at high speed or reduced capacity to remove from the milk product a large portion of its liquid vehicle and thereby produce a cream of high butter fat content, as described in my prior Patent No. 1,791,068 of February 3, 1931. The centrifugal separator should be adjusted to produce cream having a butter fat content between 65% and 85%, as described in that patent.

The cream discharged by the centrifuge is carefully cooled to a temperature sufficiently low to render it plastic and of good keeping quality; e. g., to a temperature below 50° F. The cream may be stored in this condition until it is desired to convert it into butter or it may be shipped to a central point at which such conversion is adapted to take place.

In the step of converting the high butter fat content cream into butter, the cream is blended with liquid in sufficient quantity to produce a blended cream product which is substantially completely fluid. The liquid added will vary with the proportions of ingredients of the cream under treatment and the nature and quality of the butter which is desired. Such liquid may comprise sweet or cultured milk or cream or starter or it may comprise water or another suitable liquid to which starter or flavoring substances may or may not have been added. The purpose of adding a liquid at this stage of the operation is to blend with the liquid vehicle in which the butter fat globules are suspended in the cream another liquid adapted to vary the composition thereof. If the liquid vehicle of the cream does not contain as large a proportion of solids not fat as are desired in the finished butter such solids are incorporated in the added liquid. If, on the other hand, the acidity of the cream is not as high as that desired in the finished butter, the added liquid should contain acid.

The liquid added to the cream may contain salt, coloring matter and other constituents in the desired proportions, the addition of such ingredients at this stage of the operation facilitating their dispersion throughout the mass of material which is to be converted into butter, as this mass contains liquid in the continuous phase at this stage of the operation and the dispersion of soluble constituents in the mass is accordingly rapid and complete.

In the preferred practice of the invention the quantity of liquid added to the cream is sufficient to produce a blended liquid product containing from 45 to 55% butter fat content. After the supplemental liquid is added to the cream product and blended therewith to produce a liquid cream product as described above, the thus diluted product is churned for a brief period in order to convert it into butter. Such churning operation may be effected in a churn of conventional design in a small fraction of the time ordinarily required for the churning of creams of normal butter fat content to produce butter.

From the above discussion it will be evident that the practice of the present invention renders possible the production of a butter of accurately controlled composition, the production of a butter of the desired composition requiring merely an analysis of the high butter fat cream under treatment and addition of liquid in proportions and amounts necessary to blend with the liquid vehicle of the cream under treatment to produce a liquid vehicle having the desired composition.

In many cases it is desirable to remove from the cream under treatment certain of its ingredients and to replace these ingredients in the finished butter with other ingredients differing in composition or superior in quality to the removed ingredients. In such case the milk product from which the cream is produced may be subjected to washing and/or other purifying operations to remove undesired ingredients and these ingredients may be replaced by others of similar or different character incident to the dilution of the high butter fat content cream prior to its conversion into butter.

In the performance of the cooling operation by means of which the high butter fat content cream discharged by the centrifugal separator is converted into a solid plastic product, it is important that agitation of the mass of cream under treatment be carefully avoided in order to prevent conversion of this cream into butter at this stage of the operation. Cooling apparatus by which such object may be accomplished is described in my co-pending application Serial No. 705,209, filed January 4, 1934, for Manufacture of plastic cream.

The invention possesses especial importance when applied to the manufacture of butter from sour milk products. Such products, when received at the creamery, frequently contain ingredients in very bad condition. The curd of received cream, for example, is often in such poor condition as the result of the action of bacteria and acids thereon that it is unsatisfactory for butter making. An important feature of the invention constitutes the discovery of a process by which such undesired constituents may be removed and replaced by others to produce a high grade butter. In accordance with the present invention sour cream may be subjected to neutralizing and washing operations adapted to reduce the acidity of the cream and remove a large proportion of the undesired curd and neutralizing products and a high butter fat content cream produced from such neutralized and washed cream by centrifuging may thereafter be diluted with milk to replace the removed solids and produce a cream which may be converted into butter of a quality comparable to that produced from sweet cream. Such cream may also have live steam or other gases passed therethrough in order to remove volatile impurities tending to give the resulting product an offensive odor. In the preferred practice of the invention, the washing and steam-treating operations are performed in connection with the subjection of the neutralized sour cream to centrifugal separation to produce a cream containing from 65 to 85% butter fat.

According to a typical example of the practice of the invention, sour cream is first neutralized by the addition of a neutralizing agent constituting a mixture of sodium carbonate and sodium hydroxide until its acidity is reduced to approximately 0.05%, the cream being heated in vats to approximately 110° F. during action of the neutralizer thereon in order to facilitate the curd dispersing action of the neutralizer. The neutralized cream is then passed into confluence with a flowing stream of hot water, and live steam is injected into the flowing stream of cream and hot water during the passage thereof to a centrifugal separator. The ingredients are vented before reaching the separator by passage to the open feed cup of the separator, thereby allowing steam to escape and carry with it volatile impurities derived from the cream. The steam serves the dual function of removing impurities from the cream and of flash-pasteurizing the cream during its passage to the separator. Such flash-pasteurizing immediately prior to the centrifugal separation constitutes an important feature of the invention, as prolonged contact of steam or hot water with the neutralized milk product has a tendency to cause a saponification thereof and accordingly prevents efficient performance of the separating function.

The mixture of cream and water is next passed through the centrifugal separator, the water serving to wash the cream and remove therefrom a large part of its curd content and of the products of reaction of the neutralizer upon the cream. The purified cream discharged from the separator is cooled in the same manner as described in connection with the treatment of ordinary cream described above and the subsequent treatment of the cream to convert it into butter is the same as described in the preceding example.

While the addition of hot water and live steam to a stream of cream flowing to the centrifugal separator has been described above only in connection with the treatment of sour cream, these features of the invention are likewise applicable to the treatment of sweet cream which is to be treated in the practice of the invention, as it is frequently desirable to effect removal of impurities from such cream by the washing and steaming operations of the invention prior to conversion thereof into butter.

Modifications will be obvious to those skilled in the art and I do not therefore wish to be limited except by the scope of the subjoined claims. In these claims, I wish it to be understood that the term "neutralization" is used in its sense as commonly accepted in the butter-making industry; i. e., as including the reduction or standardizing of acidity by means of alkali, whether or not such alkali is added in sufficient quantity to react with all of the acid present.

I claim:

1. A process of producing butter from cream containing over 65% butter fat which comprises adding a liquid to the cream to effect a blend containing between 45 and 55% butter fat in the dispersed phase and thereafter churning the blended cream product so produced to convert it into butter.

2. A process of producing butter from cream containing over 65% butter fat which comprises adding a starter to the cream to effect a blend containing between 45 and 55% butter fat in the dispersed phase and thereafter churning the blended cream product so produced to convert it into butter.

3. A process of producing butter from cream containing over 65% butter fat which comprises adding water to the cream to effect a blend containing between 45 and 55% butter fat in the dispersed phase and thereafter churning the blended cream product so produced to convert it into butter.

4. A process of producing butter from cream containing over 65% butter fat which comprises adding milk to the cream to effect a blend containing between 45 and 55% butter fat in the dispersed phase and thereafter churning the blended cream product so produced to convert it into butter.

5. A process of producing butter from cream containing over 65% butter fat which comprises adding a more dilute cream to the cream to effect a blend containing between 45 and 55% butter fat in the dispersed phase and thereafter churning the blended cream product so produced to convert it into butter.

6. A process of producing butter which comprises subjecting a milk product to centrifugal force to produce a cream containing over 65% butter fat, cooling the resulting cream to a plastic condition, adding a liquid to the cream to effect a blend containing between 45 and 55% butter fat in the dispersed phase and thereafter churning the blended cream product so produced to convert it into butter.

7. A process of producing butter which comprises subjecting a milk product to a washing operation to remove undesired constituents therefrom, thereafter subjecting the resulting product to centrifugal force to produce a cream containing over 65% butter fat, adding a liquid to the cream to effect a blend containing between 45 and 55% butter fat in the dispersed phase and thereafter churning the blended cream product so produced to convert it into butter.

8. A process of producing butter which comprises passing steam through a milk product to remove undesired volatile ingredients therefrom, subjecting the resulting milk product to centrifugal force to produce a cream containing over 65% butter fat, adding a liquid to the cream to effect a blend containing between 45 and 55% butter fat in the dispersed phase and thereafter churning the blended cream product so produced to convert it into butter.

9. A process of producing butter which comprises subjecting a milk product to a washing operation and passing steam therethrough to remove undesired constituents therefrom, subjecting the resulting milk product to centrifugal force to produce a cream containing over 65% butter fat, adding a liquid to the cream to effect a blend containing between 45 and 55% butter fat in the dispersed phase and thereafter churning the blended cream product so produced to convert it into butter.

10. A process of producing butter which comprises passing a milk product continuously to a centrifugal separator, passing hot water into confluence with the flowing stream of milk product, subjecting the mixture of hot water and the milk product so produced to centrifugal force to produce a cream containing over 65% butter fat, adding a liquid to the cream to effect a blend containing between 45 and 55% butter fat in the dispersed phase and thereafter churning the blended cream product so produced to convert it into butter.

11. A process of producing butter which comprises passing a milk product continuously to a centrifugal separator, passing hot water into confluence with the flowing stream of milk product, passing steam into the flowing stream of milk product and water, venting the steam passed into said flowing stream, thereafter subjecting the mixture of ingredients to centrifugal force to produce a cream containing over 65% butter fat, adding a liquid to the cream to effect a blend containing between 45 and 55% butter fat in the dispersed phase and thereafter churning the blended cream product so produced to convert it into butter.

12. A process of producing butter which comprises passing a milk product continuously to a centrifugal separator, passing steam into the flowing stream of milk product, venting the steam passed into said flowing stream and thereafter subjecting the mixture of ingredients to centrifugal force to produce a cream containing over 65% butter fat, adding a liquid to the cream to effect a blend containing between 45 and 55% butter fat in the dispersed phase and thereafter churning the blended cream product so produced to convert it into butter.

HERMAN D. WENDT.